Patented May 22, 1951

2,553,800

UNITED STATES PATENT OFFICE 2,553,800

HYDROGEN-HALOGEN EXCHANGE PROCESS

James P. West, Westmont, and Louis Schmerling, Riverside, Ill., assignors to Universal Oil Products Company, Chicago, Ill., a corporation of Delaware No Drawing. Application December 24, 1948, Serial No. 67,256

16 Claims. (Cl. 260—658)

This invention relates to a novel catalytic method of effecting hydrogen-halogen exchange between carbon tetrachloride, carbon tetrabromide, or a completely halogenated bromochloromethane and a halogenated methane containing more than 1 and less than 4 halogen atoms selected from the group consisting of chlorine and bromine atoms.

In one embodiment our invention relates to a hydrogen-halogen exchange process which comprises contacting a tetrahalomethane in which the halogen atoms are selected from the group consisting of chlorine and bromine atoms with a halogenated methane containing more than 1 and less than 4 halogen atoms selected from the group consisting of chlorine and bromine atoms in the presence of a compound capable of yielding a free radical at a temperature at least as high as the decomposition temperature of said last-named compound.

In a more specific embodiment our invention relates to a process for the production of bromotrichloromethane which comprises reacting carbon tetrabromide with chloroform in the presence of a compound capable of yielding a free radical at a temperature at least as high as the decomposition temperature of said compound.

The halogen donors utilizable in our process comprise tetrahalomethanes in which the halogen atoms are selected from the group consisting of chlorine and bromine atoms. This class of halomethanes consists of carbon tetrachloride, carbon tetrabromide, bromotrichloromethane, dibromodichloromethane and chlorotribromomethane.

The hydrogen donors that may be used in our process comprise halogenated methanes containing more than 1 and less than 4 halogen atoms selected from the group consisting of chlorine and bromine atoms. This class of compounds includes dichloromethane, bromochloromethane, chloroform, bromoform, chlorodibromomethane and bromodichloromethane.

From the foregoing lists of reactants, it can be seen that a large number of desirable products can be prepared by means of our process. It is possible, however, to select reactants that will yield products that are the same as the starting materials. Such operations, of course, are not contemplated.

The catalysts that may be used in the present process comprise compounds capable of yielding free radicals at the reaction conditions. Examples of such compounds are tetraethyl lead, diazomethane, hexaphenylethane, triphenyl- methylazobenzene, zinc alkyls, and cobalt alkyls. Another group of compounds capable of yielding free radicals are peroxy compounds which contain the bivalent radical —O—O—. Examples of such peroxy compounds are the inorganic peroxy compounds such as alkali metal and ammonium persulfates, perborates and percarbonates; the organic hydroperoxides such as tertiary butyl hydroperoxide, methylcyclohexyl hydroperoxide, peracetic acid, and persuccinic acid; and the organic peroxides such as dimethyl peroxide, diethyl peroxide, methyl ethyl peroxide, ditertiary butyl peroxide, dipropyl peroxide, acetyl peroxide, propionyl peroxide, butyryl peroxide, lauroyl peroxide, benzoyl peroxide, acetyl benzoyl peroxide, tetralin peroxide, and tertiary butyl perbenzoate. The organic peroxides constitute a preferred class of catalysts for use in this invention. Only catalytic amounts, i. e., less than stoichiometric amounts need be used in our process.

The process of this invention may be carried out in batch operation by placing a quantity of a suitable carbon tetrahalide, a quantity of a suitable di- or trihalomethane, and a catalytic amount of a compound capable of yielding a free radical, in a reactor equipped with a mixing device, heating to a reaction temperature while mixing the contents of the reactor, cooling after a suitable period of time, and recovering the products.

The preferred method of operation is of the continuous type. In this type of operation the reactants and the catalyst are continuously charged to a reactor maintained at suitable conditions of temperature and pressure. The reactor may be an unpacked vessel or coil, or it may contain an adsorbent packing material such as fire brick, alumina, dehydrated bauxite, and the like. The products are separated from the reactor effluent and the unconverted reactor effluent and the unconverted reactants may be recycled to the reaction zone.

The temperatures employed in the process of this invention should be at least as high as the initial decomposition temperature of the compound capable of yielding a free radical. In the case of tertiary butyl perbenzoate, for example, the decomposition temperature is rather sharply defined and is approximately 115° C. On the other hand, benzoyl peroxide decomposes over a relatively wide temperature range. Usually, little advantage is gained if the reaction is conducted at a temperature more than 150° C. higher than the decomposition temperature of the catalyst.

The hydrogen-halogen exchange reaction disclosed herein takes place when the reactants are in the vapor phase as well as when they are in the liquid phase. However, liquid phase operation is preferred, consequently, the pressure at which the reaction is conducted will be chosen accordingly.

The reaction times may be within the range of from slightly less than one minute to several hours. However, contact times of at least 10 minutes usually are preferred.

There are certain modifications of our process that sometimes are useful. One such modification comprises conducting the reaction in the presence of an inorganic alkaline substance such as potassium carbonate, sodium bicarbonate, magnesium oxide, and the like. Another modification comprises carrying out the reaction in the presence of water, with or without the addition of emulsifying agents.

The following examples are given to illustrate our invention, but it is to be understood that they are introduced for illustrative and not for limitative purposes.

*Examples 1 and 2*

The experiment designated as Example 1 was carried out at atmospheric pressure by heating the reactants and the catalyst in a glass flask under reflux. The other experiment was carried out in a rotating autoclave under an initial nitrogen pressure of 50 atmospheres.

| Example No. | 1 | 2 |
|---|---|---|
| Hydrogen Donor | $CHCl_3$ | $CHCl_3$ |
| Halogen Donor | $CBr_4$ | $CBr_4$ |
| Peroxide | Benzoyl Peroxide. | Benzoyl Peroxide. |
| Reactants, gram mols: | | |
| Hydrogen Donor | 0.50 | 0.20 |
| Halogen Donor | 0.24 | 0.20 |
| Peroxide | 0.021 | 0.034 |
| Pressure, Atm. | 1 | ¹ 50 |
| Temperature, °C. | 81 | 130–140 |
| Duration, Hours | 16 | 4 |
| Products, gram mols: | | |
| $BrCCl_3$ | 0.05 | 0.08 |
| $HCBr_3$ | 0.04 | 0.11 |

¹ Initial nitrogen pressure.

It can be seen that significant yields were obtained at the lower temperature, but that appreciably better yields were obtained at the higher temperature.

*Examples 3 and 4*

The following two examples show that the presence of water and of potassium carbonate in the reaction mixture increase the yields of the desired products. For example, when chloroform and carbon tetrabromide are contacted with benzoyl peroxide and 2.0 gram mols of water at the conditions listed under Example 1 (except for the reaction temperature which is 95° C.), the yields of bromotrichloromethane and of bromoform are approximately doubled. The yields also are approximately doubled when 0.10 gram mol of potassium carbonate are used in an experiment that otherwise duplicates Example 1.

*Example 5*

When 0.50 gram mol of bromoform and 0.25 gram mol of carbon tetrachloride are contacted with 0.034 gram mol of di-t-butyl peroxide at a temperature of 140° C. for 4 hours at an initial nitrogen pressure of 50 atmospheres, the principal products are chlorotribromomethane and chloroform.

*Example 6*

When 0.30 gram mol of dichloromethane and 0.30 gram mol of bromotrichloromethane are contacted with 0.034 gram mol of di-t-butyl peroxide at the conditions specified in Example 5, the principal products of the reaction are chloroform and bromodichloromethane.

We claim as our invention:

1. A hydrogen-halogen exchange process which comprises contacting a tetrahalomethane in which the halogen atoms are selected from the group consisting of chlorine and bromine atoms with a halogenated methane containing more than 1 and less than 4 halogen atoms selected from the group consisting of chlorine and bromine atoms in the presence of a compound capable of yielding a free radical at a temperature at least as high as the decomposition temperature of said last-named compound.

2. The process of claim 1 further characterized in that the compound capable of yielding a free radical is a peroxy compound.

3. The process of claim 1 further characterized in that the compound capable of yielding a free radical is an organic peroxide.

4. A hydrogen-halogen exchange process which comprises contacting carbon tetrachloride with a halogenated methane containing more than 1 and less than 4 halogen atoms selected from the group consisting of chlorine and bromine atoms with a compound capable of yielding a free radical at a temperature at least as high as the decomposition temperature of said last-named compound.

5. The process of claim 4 further characterized in that the compound capable of yielding a free radical is a peroxy compound.

6. The process of claim 4 further characterized in that the compound capable of yielding a free radical is an organic peroxide.

7. A hydrogen-halogen exchange process which comprises contacting carbon tetrabromide with a halogenated methane containing more than 1 and less than 4 halogen atoms selected from the group consisting of chlorine and bromine atoms with a compound capable of yielding a free radical at a temperature at least as high as the decomposition temperature of said last-named compound.

8. The process of claim 7 further characterized in that the compound capable of yielding a free radical is a peroxy compound.

9. The process of claim 7 further characterized in that the compound capable of yielding a free radical is an organic peroxide.

10. A process for the production of bromotrichloromethane which comprises reacting carbon tetrabromide with chloroform in the presence of a compound capable of yielding a free radical at a temperature at least as high as the decomposition temperature of said compound.

11. A hydrogen-halogen exchange process which comprises contacting a tetrahalomethane in which the halogen atoms are selected from the group consisting of chlorine and bromine atoms with a halogenated methane containing more than 1 and less than 4 halogen atoms selected from the group consisting of chlorine and bromine atoms in the presence of a compound capable of yielding a free radical at a temperature at least as high as the decomposition temperature of said last-named compound and in the presence of water.

12. The process of claim 11 further characterized in that the compound capable of yielding a free radical is a peroxy compound.

13. The process of claim 11 further characterized in that the compound capable of yielding a free radical is an organic peroxide.

14. A hydrogen-halogen exchange process which comprises contacting a tetrahalomethane in which the halogen atoms are selected from the group consisting of chlorine and bromine atoms with a halogenated methane containing more than 1 and less than 4 halogen atoms selected from the group consisting of chlorine and bromine atoms in the presence of a compound capable of yielding a free radical at a temperature at least as high as the decomposition temperature of said last-named compound and in the presence of a minor amount of an inorganic alkaline substance.

15. The process of claim 14 further characterized in that the compound capable of yielding a free radical is a peroxy compound.

16. The process of claim 14 further characterized in that the compound capable of yielding a free radical is an organic peroxide.

JAMES P. WEST.
LOUIS SCHMERLING.

REFERENCES CITED

The following references are of record in the file of this patent:

Calingeart et al., "Jour. Am. Chem. Soc.," vol. 61, pages 2748–54 (1939); vol. 62, pages 1545–7 (1940).